Feb. 28, 1939.   F. F. HOSMER   2,148,813
ANIMAL TRAP
Filed Sept. 29, 1937
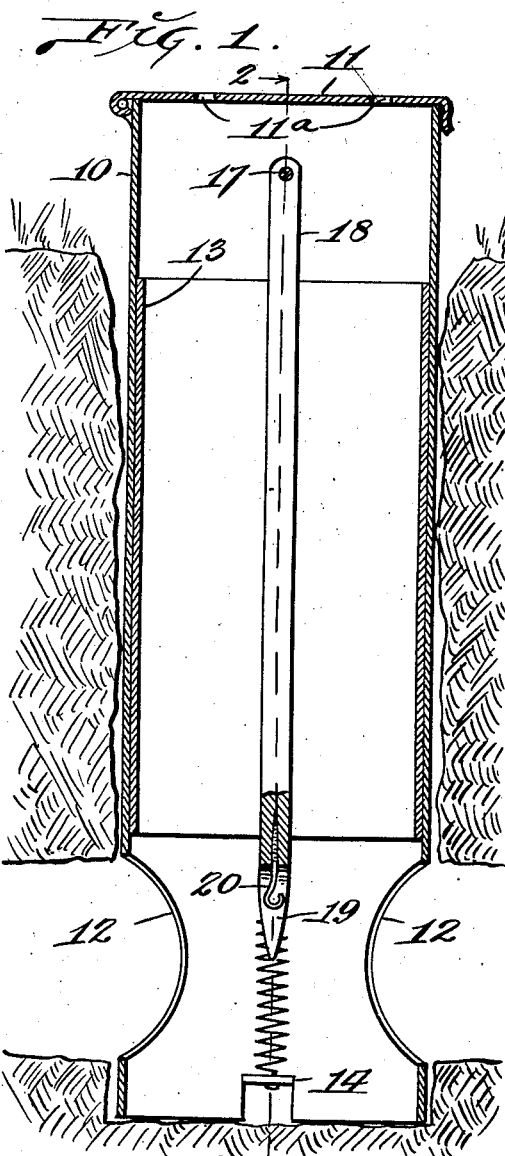
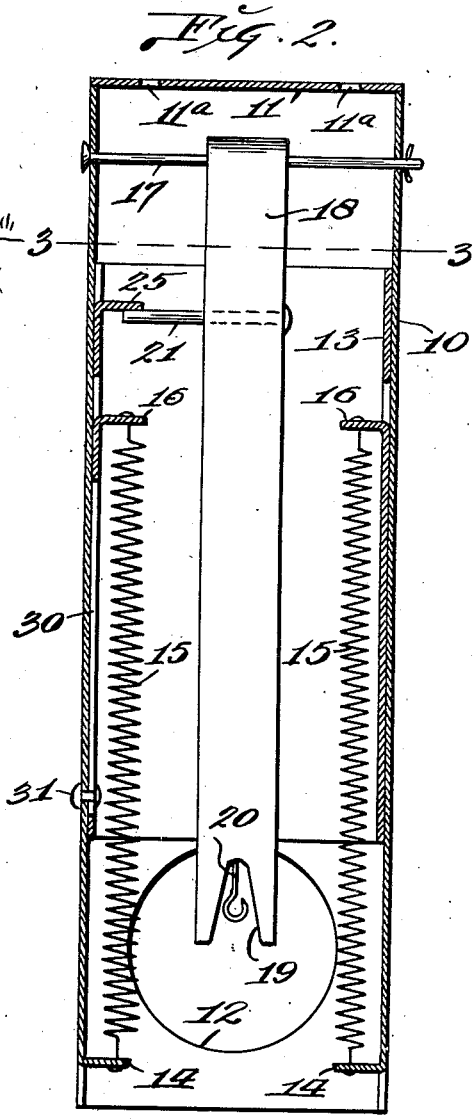
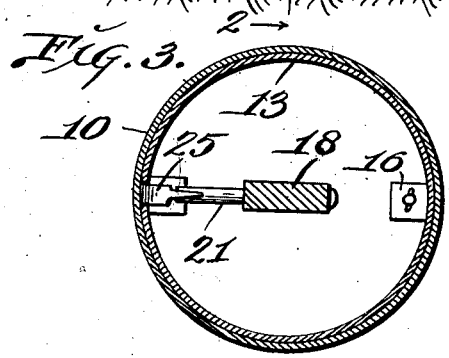
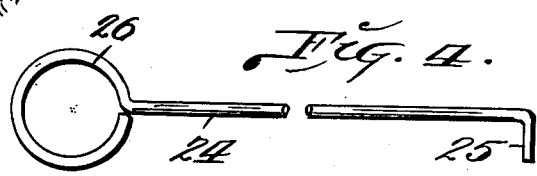
INVENTOR,
FRANK F. HOSMER.
BY Martin P. Smith ATTY.

Patented Feb. 28, 1939

2,148,813

UNITED STATES PATENT OFFICE 2,148,813

ANIMAL TRAP

Frank F. Hosmer, Glendale, Calif.

Application September 29, 1937, Serial No. 166,317

5 Claims. (Cl. 43—80)

My invention relates to a trap, and has for its principal object, the provision of a relatively simple, practical and inexpensive trap that is especially designed for catching gophers, ground squirrels, rats, moles and other burrowing Rodentia.

Further objects of my invention are to provide a trap of the character referred to, that may be easily and quickly set without attendant danger of injury to the hands of the person manipulating the trap. Further, to construct the trap so that it may be readily opened, so as to permit the removal of the trapped animal, and further to provide a trap, which, when sprung or released, acts instantly to practically decapitate the animal that springs the trap, thus killing the animal quickly without attendant suffering.

A further object of my invention is to provide a trap that may be positioned for use in the ground without requiring the excavation of any considerable amount of earth, and which provision is advantageous especially where the trap is used on lawns, flower beds and in gardens where young fruit trees, berry bushes and vegetables are planted.

With the foregoing and other objects in view, my invention consists in certain novel features of construction and arrangements of parts that will be hereinafter more fully described and claimed, and illustrated in the accompanying drawing in which:

Fig. 1 is a vertical section taken through the center of a trap constructed in accordance with my invention, and showing the same positioned in the ground for trapping a burrowing animal such as a gopher or ground squirrel.

Fig. 2 is a vertical section taken on the line 2—2 of Fig. 1.

Fig. 3 is a horizontal section taken on the line 3—3 of Fig. 2.

Fig. 4 is a side elevational view of a hook that is utilized in setting the trap.

Referring by numerals to the accompanying drawing which illustrates a preferred embodiment of my invention, 10 designates a tube preferably formed of sheet metal, the lower end of which is open, and the upper end being normally closed by a hinged cover plate 11.

Formed in the lower portion of the tube 10, at diametrically opposite points, are openings 12 of sufficient size to permit the entrance of small rodents such as gophers, rats and ground squirrels.

Arranged to slide freely within the tube 10 is a tube 13 that is somewhat shorter than the outer tube 10, so that when tube 13 is elevated, its lower edge will occupy a position above the openings 12.

Ears 14, that are formed from the material in the wall of tube 10, project inwardly from the lower end of said tube, and said ears form points of attachment for the lower ends of retractile springs 15. These springs extend upwardly through the lower portion of the sliding tube 13, and their upper ends are secured to ears 16 that project inwardly from the upper portion of said inner tube. The ears 16 and 14 and springs 15 occupy a vertical plane at right angles to the plane occupied by the openings 12.

Extending diametrically through the upper portion of tube 10 is a rod 17, on the central portion of which is mounted to swing freely, a vertically disposed bar 18 which may be formed of wood or metal, and the lower end of this bar terminates at a point between the openings 12.

The lower end of bar 18 is provided with an inverted V-shaped notch 19, and seated in the bar in the apex of said notch is a short depending hook 20 that is adapted to support a bait or lure.

Projecting from one edge of bar 18, near its upper end, is a pin 21, and adapted to rest thereupon, is a finger 23 that projects inwardly from the upper portion of the sliding inner tube 13.

The hook or handle utilized in setting the trap is illustrated in Fig. 4 and comprises a straight shank 24, the lower end of which is bent at right angles to form a short finger 25 that is adapted to engage beneath either one of the ears 16 that project inwardly from the upper portion of sliding tube 13. The upper end of the shank 24 terminates in a loop 26 that is adapted to be engaged by a finger while manipulating the hook.

In the use of my improved trap, a hole slightly larger than the diameter of tube 10 is formed in the ground by means of a conventional earth auger or the like, said hole being located so that its lower portion intersects the tunnel or runway that is dug in the ground by the rodent. The position of these tunnels or runways may be readily located by the mounds of earth that are formed on the surface of the ground by the rodents, and which mounds of earth occur at intervals throughout the length of the tunnels.

After the trap has been positioned in the hole prepared by the auger, with the openings 12 registering with the tunnel or runways formed by the rodents, cover 11 is swung into open position and the bent end 25 of the hook is positioned beneath one of the ears 16. By pulling upward on the hook, inner tube 13 is drawn upwardly so that its lower edge occupies a position above the openings 12, and when so positioned, the bar 18 is moved into position so that the pin 21 is positioned directly beneath and forms a rest for the finger 23 that projects inwardly from the upper portion of the sliding inner tube. As the inner tube is drawn upwardly, as just described, the springs 15 are expanded so as to impart tension thereto.

A rodent traveling in either direction through the tunnel toward the trap will, on approaching the trap, move his head through one of the openings 12 and upon contact with the lower end of the bar 18, the same will be swung a short distance so as to move pin 21 from beneath finger 23, whereupon the tension stored in springs 15 will instantly draw the sliding tube 13 downwardly, thus causing the instant death of the rodent.

To increase the effectiveness of the trap, a suitable bait or lure may be placed on the hook 20 that is seated in the lower end of the swinging bar 18.

To prevent rotation of the sliding tube 13 within the housing 10, a longitudinally disposed slot 30 is formed in tube 13, and passing through said slot is a rivet 31 that is seated in the housing 10. This slot is preferably formed in the tube 13, below the finger 23, so that regardless of the fit of the tube 13 in the housing, the finger 23 will always be in position to engage on top of the pin 21.

Formed in the cover 11 are two or more small apertures 11a which permit rays of light to pass downwardly through the trap, and in practice, it has been demonstrated that animals, and particularly gophers, will be attracted by the rays of light and consequently increase the possibilities of catching the gophers in the trap.

An especial advantage of my improved trap is that the same may be set and handled without danger of injury to the hands of the person handling the trap, and further, the trap has the desirable feature of killing the trapped animals instantly.

Thus it will be seen that I have provided an animal trap that is relatively simple in construction, inexpensive of manufacture and very effective in performing the functions for which it is intended.

It will be understood that minor changes in the size, form and construction of the various parts of my improved animal trap may be made and substituted for those herein shown and described, without departing from the spirit of my invention, the scope of which is set forth in the appended claims.

I claim as my invention:

1. In an animal trap, a housing, provided in its lower portion with oppositely arranged openings, a tubular member arranged for sliding movement within said housing, retractile springs arranged between said housing and tubular sliding member, which springs are expanded when the tubular sliding member is elevated and a member mounted for swinging movement within the housing and tubular sliding member for holding the latter in elevated position, the lower end of which swinging member terminates between the openings in the lower portion of the housing.

2. In an animal trap, comprising a housing, provided in its lower portion with oppositely arranged openings, a tubular member arranged for sliding movement in said housing, retractile springs arranged between said housing and tubular sliding member, a projection on the upper portion of said tubular sliding member, a member pivoted in the upper portion of said housing and extending downwardly through said housing and tubular sliding member, the lower portion of which pivoted member terminates between the openings in the lower portion of the housing and a pin projecting from said pivoted member for engaging beneath the projection on the tubular sliding member to hold the same in elevated position against the tension of said springs.

3. In an animal trap, comprising a housing, provided in its lower portion with oppositely arranged openings, a tubular member arranged for sliding movement in said housing, retractile springs arranged between said housing and tubular sliding member, a projection on the upper portion of said housing and extending downwardly through said housing and tubular sliding member, the lower portion of which pivoted member terminates between the openings in the lower portion of the housing, a pin projecting from said pivoted member for engaging beneath the projection on the tubular sliding member to hold the same in elevated position against the tension of said springs and a hook on the lower portion of said pivoted member.

4. In an animal trap, a housing, provided in its lower portion with oppositely arranged openings, a tubular member arranged for sliding movement within said housing, retractile springs arranged between said housing and tubular sliding member, which springs are expanded when the tubular sliding member is elevated, a member mounted for swinging movement within the housing and tubular sliding member for holding the latter in elevated position, the lower end of which swinging member terminates between the openings in the lower portion of the housing and means for holding the tubular sliding member against rotation within the housing.

5. In an animal trap, a housing, provided in its lower portion with oppositely arranged openings, a tubular member arranged for sliding movement within said housing, retractile springs arranged between said housing and tubular sliding member, which springs are expanded when the tubular sliding member is elevated, a member mounted for swinging movement within the housing and tubular sliding member for holding the latter in elevated position, the lower end of which swinging member terminates between the openings in the lower portion of the housing, a cover for said housing and said cover being provided with light admission openings.

FRANK F. HOSMER.